(12) United States Patent
Battlogg et al.

(10) Patent No.: US 8,886,403 B2
(45) Date of Patent: Nov. 11, 2014

(54) SUSPENSION SYSTEM FOR A BICYCLE AND METHOD OF CONTROLLING A SUSPENSION SYSTEM

(75) Inventors: Stefan Battlogg, St. Anton I.M. (AT);
Martin Walthert, Aarberg (CH);
Gernot Elsensohn, St. Anton I.M. (AT);
Jürgen Pösel, Bludenz (AT)

(73) Assignee: DT Swiss, Inc., Grand Junction, CO (US)

( * ) Notice: Subject to any disclaimer, the term of this patent is extended or adjusted under 35 U.S.C. 154(b) by 388 days.

(21) Appl. No.: 13/336,138

(22) Filed: Dec. 23, 2011

(65) Prior Publication Data
US 2012/0166044 A1    Jun. 28, 2012

(30) Foreign Application Priority Data

Dec. 23, 2010  (DE) .......................... 10 2010 055 828

(51) Int. Cl.
*G06F 19/00* (2011.01)
*F16F 9/50* (2006.01)
*F16F 9/53* (2006.01)

(52) U.S. Cl.
USPC ............... 701/37; 280/5.5; 702/114; 702/116

(58) Field of Classification Search
USPC ......... 188/266.1; 702/113, 141, 33, 114, 115, 702/116; 701/37
See application file for complete search history.

(56) References Cited

U.S. PATENT DOCUMENTS

| | | | | |
|---|---|---|---|---|
| 7,395,167 B2 * | 7/2008 | Frolik | ........................... | 702/113 |
| 7,831,403 B2 * | 11/2010 | Frolik | ........................... | 702/113 |
| 8,560,173 B2 * | 10/2013 | Matsuda | ......................... | 701/38 |
| 2006/0064223 A1 * | 3/2006 | Voss | ................................ | 701/52 |
| 2006/0265144 A1 * | 11/2006 | Frolik | ........................... | 702/33 |
| 2008/0249734 A1 * | 10/2008 | Frolik | ........................... | 702/113 |
| 2012/0160621 A1 * | 6/2012 | Battlogg et al. | ........... | 188/267.2 |

FOREIGN PATENT DOCUMENTS

DE         102008006051 A1     7/2009

* cited by examiner

*Primary Examiner* — Ronnie Mancho
(74) *Attorney, Agent, or Firm* — Laurence A. Greenberg; Werner H. Stemer; Ralph E. Locher

(57) ABSTRACT

A suspension system and a method for controlling a suspension system for a muscle-powered two-wheeled vehicle having a damper device with a first damper chamber and a second damper chamber coupled with one another via a controllable damping valve. A sensor is provided for capturing data about a current operational state. An electric control device and a data storage device for controlling the damper device are provided, such that at least one damping characteristic of the damper device can be influenced by a signal from the control device. The control device is configured and organized to provide a teaching mode in which route-related data are stored in the memory. The control device is furthermore configured and organized to provide a repeat mode in which the damper device is controlled according to the route-related data stored in the memory device.

15 Claims, 8 Drawing Sheets

SUSPENSION SYSTEM FOR A BICYCLE AND METHOD OF CONTROLLING A SUSPENSION SYSTEM

CROSS-REFERENCE TO RELATED APPLICATION

This application claims the priority, under 35 U.S.C. §119, of German application DE 10 2010 055 828.1, filed Dec. 23, 2010; the prior application is herewith incorporated by reference in its entirety.

BACKGROUND OF THE INVENTION

Field of the Invention

The present invention relates to a suspension control or a suspension system for an at least partially muscle-powered two-wheeled vehicle and in particular a bicycle with at least one controllable damper device.

In the prior art suspension systems for bicycles have become known in which the user changes for example manually the damper characteristics of the damper employed for example when the ground quality changes. When the user firstly travels on a road having a smooth surface, he can virtually deactivate the damper. Then when he travels on an unpaved track, other damping settings will be more suitable. Also, one user may prefer more intense damping for shocks while another user prefers little influence by the damper.

The question as to what constitutes the best damping settings does not only depend on the terrain but also on the requirements of the user.

It is a drawback of the prior art dampers that in relation to the terrain and to the user said user may have to frequently reset the damping characteristics to achieve the results he desires.

SUMMARY OF THE INVENTION

It is accordingly an object of the invention to provide a suspension system for a bicycle and a method which overcome the above-mentioned disadvantages of the heretofore-known devices and methods of this general type and which provide for a suspension control or a suspension system which operates at a reduced quantity of changes to the damping characteristics.

With the foregoing and other objects in view there is provided, in accordance with the invention, a suspension system for an, at least partly muscle-powered, vehicle, such as a bicycle. The suspension system comprises:

at least one controllable damper device;

a control device, a memory device, and an operating device for controlling said damper device;

said control device being configured to output a control signal for influencing at least one damping characteristic of said damper device;

said control device being configured to operate in a teaching mode in which route-related data are stored in said memory device; and said control device being configured to operate in a repeat mode in which said damper device is controlled according to the route-related data stored in said memory device.

In other words, the objects of the invention are achieved by way of a suspension system for a (at least partially muscle-powered two-wheeled or multi-wheeled) vehicle and in particular for a bicycle. It includes one or more controllable damping devices. A control device and storage device as well as an operating device are provided for controlling the damper device. At least one damping characteristic of the at least one damper device can be influenced by a signal of the control device. The control device is configured and organized to provide at least one teaching mode in which route-related data are stored in the storage device. Furthermore the control device is configured and organized to provide at least one repeat mode in which at least one of the at least one damper device can be controlled according to the route-related data stored in the storage device.

At least one sensor is provided which during operation captures route-related data about the operational state and/or operator input. Preferably captured route-related data are stored in the storage device.

The suspension system according to the invention has many advantages since it allows operation involving reduced user input without limiting or impeding possible intervention in the suspension system. Repeatedly traveling predetermined routes is possible for example for comparing the setting parameters of other riders with one's own or for optimizing one's own settings. The suspension system controls or regulates in particular the damping characteristics of a suspension fork and a rear wheel damper. The route-related data are stored in the storage device or otherwise accessible to the control device.

The suspension system is preferably provided with at least one sensor which captures route-related operational data and/or route-related operator input as route-related data and stores the same in the storage device. In this way it is possible to retrieve and for example analyze the stored route-related data at a later time.

Preferably the storage device is configured and organized to store operator data as the data in the storage device. Preferably the control device is configured to retrieve route-related data stored in the storage device and to control at least one of the at least one damper device by way of at least one signal of the control device depending on the route-related data. When the user travels a specific route with the bicycle equipped accordingly, he can thereafter analyze whether the changes he made have achieved the intended result.

It is furthermore possible when traveling the same route again at a later time to call up the data stored in the storage device and to apply these automatically such that in another, following ride user input may no longer be required. In this way, optimizing the damping characteristics is possible over specific routes or laps. In a second or third lap the quantity of required input is considerably reduced until an optimum is given in which no input at all may be required. Still the user retains the option to change at will the set damping characteristics.

In this way the user receives particularly flexible options since he can on the one hand focus his full attention on the route traveled and is not diverted from the ride by continually changing the damping characteristics of the damper device. On the other hand it can at any time intervene in the damping characteristics and modify them as currently desired. Optionally this may comfortably occur via an operating device disposed at the handlebar or via a hand-held operating device.

The term lap in the sense of the present application is not only understood to mean one lap of a circular tour but it includes any random stretch which can be traveled repeatedly. This term also includes a training tour, day trip, or vacation trip or the route of a bicycle race extending over multiple days. The term lap is presently also understood to mean a stage or leg of a route.

Implementing the invention is possible not only for already known routes but likewise by way of direct implementation of the data captured by the sensors or of data from third parties making their data available.

The control device cannot only control but also regulate the damping device. To this end a sensor signal may be used to obtain a feedback and to modify the control signal accordingly. Regulation may be active or passive.

Preferably the damper device comprises at least two damper chambers coupled with one another. In particular is at least one sensor provided for capturing the relative movements to one another of the damper piston. The position of the damper can likewise be captured.

The captured sensor data are preferably stored in the storage device to be available for a later analysis or a later retrieval. Direct analysis is also possible.

Particularly preferably the suspension system comprises at least one GPS sensor for capturing the current position. When employing a GPS sensor the determined position is preferably stored in the storage device. Storing the position may occur at predetermined time intervals or else in dependence on the current velocity for example at specific points of the route.

With map data of the respective area stored in the storage device, a GPS sensor and the thus determined position allow to refer to the map data and even unknown stretches allow to optionally react in anticipation to the following stretches since for example any climbs recorded on the map can be taken into account in advance. In such a climb the suspension fork can for example be automatically lowered to facilitate the uphill ride for the user.

The currently traveled velocity also allows conclusions about the current state. When the speed is reduced this may be an indication of an uphill ride. When at the same time the pedaling frequency is high, there is a high probability that the ride is in fact uphill. Under these conditions shifting to uphill mode preferably occurs, in particular if additionally for example the rider's pulse rate is high.

Given high speed and low vertical acceleration, hard damping characteristics can be set since the road surface properties are highly likely good.

Minor shocks at a high frequency with high traveling speed are a clear indication of a cobblestone street.

In the case of an inclined road surface and major shocks occurring, a downhill ride can be concluded and corresponding parameters can be set automatically.

Particularly preferably a teaching mode can be activated in which the sensor data and the operating data are stored in the storage device. It is furthermore preferred for at least one repeat mode to be provided in which the damper device is controlled according to the previously stored data. The control can call up the stored data at predetermined time intervals or else for example refer to the stored data location-controlled at specific distances to provide optimal control of the damper device at any time. Control is e.g. also possible by way of the distance from a starting point. It is also possible to perform time-related control.

Particularly preferably any random modifications to the current settings are possible also in repeat mode. It is possible also for the modified settings to be stored. Or else it is possible to offer for example a special mode in which the amendments are not stored to not influence the data stored thus far, for example if a travel occurs under special conditions.

In particular is the repeat mode provided for determining the respective control data from the storage device by way of the position data and for the damper device to be controlled accordingly. These position data may comprise the earth's surface data and also altitude data. The repeat mode is particularly suitable for races and competition runs, allowing early adaptation and preparation for the competitive situation.

Preferred more specific embodiments are provided with at least one expert mode in which even elementary parameters can be changed. Settings in expert mode may for example be password-protected.

A stage principle may be given. An inexperienced user can for example be given a narrowly limited number of options such as a choice of three or five options. An experienced user may access more parameters and setting options and after entering a password or changes to normal settings he may be offered a choice of ten or twenty or more setting options. An expert may have still more setting options available. Dealers or maintenance experts can set normal configurations, calibration or other settings accessible through a protected area only.

In preferred embodiments a suspension travel limit is adjustable. In particular can the suspension travel limit be adjusted flexibly to flexibly adapt a rear wheel damper or a front wheel fork to what are the current desires and requirements.

In all of the configurations, stored data are preferably provided for transmission. Stored data sets may for example be exported and stored—encrypted or non-encrypted—in particular in the internet or in an intranet, password-protected or publicly accessible. These data from similar or different suspension systems according to the invention can be re-imported via suitable means. This allows access to the settings of other users and to download default settings for example when a specific distance is traveled for the first time. By way of accessing stored settings of other users or for example of the manufacturer one can make sure that suitable damper device conditions and characteristics are pre-set for specific routes. If the preset conditions do not correspond to the wishes of the user, intervention is possible at any time and the damping characteristics can be changed specifically.

In particular are at least two damper devices provided and can be operated coupled to one another. For example the suspension system may comprise a suspension fork and a rear wheel damper, controlling these coupled to one another such that each of the dampers is controlled at its optimal working point. Data transmission may occur wireless or wire-bound.

In all of the configurations it is preferred for operational data to be stored such as the quantity of compressions and rebounds of the damper or the kilometers traveled or the duration of use. The collected data allow to issue maintenance warnings reminding the user for example of oil changes due or the like. In this way a higher level of safety and reproducibility and comparability of suspension systems is achieved.

In all of the configurations the damper device preferably comprises at least one controllable damping valve. The damping valve may for example be provided with a damping channel filled with a rheological fluid which can be influenced by a field. Preferably magneto-rheological or electro-rheological fluids or media are employed which are influenced by electric or magnetic fields. Magneto-rheological fluids form chains in the direction of the magnetic field lines, considerably increasing their viscosity transverse to the magnetic field lines in dependence on the field strength applied.

Such a damper device allows flexible and fast controlling.

In all of the configurations it may be possible to adjust the spring hardness or vary the suspension travel.

Other than GPS sensors, other sensors may be provided at the bicycle which capture for example the traveling speed of the two-wheeled vehicle.

It is also possible and preferred to set different modes such as the modes "uphill", "downhill," "terrain," "road," etc. For lap rides it is preferred if a "teaching lap" mode can be set in which the settings are optimized to then recall the previously stored settings for lap rounds.

In all of the configurations it is also possible to provide at least one sensor for capturing the road surface properties in front of the two-wheeled vehicle. Such a sensor may for example be configured as a stereo camera, capturing the area immediately in front of the front wheel of the bicycle via image recognition such that the damping parameters can be modified accordingly.

Other than GPS sensors other sensors may be employed for example for measuring and analyzing the velocity of the bicycle and for capturing the speed or the force on the damper. Capturing the climb or slope is possible as well.

All the stored data can in particular be retrieved, modified, and stored again.

It is possible and preferred to set different modes such as the mode "uphill" or the modes "downhill," "terrain," "road," or "lap rides."

The damper device may be provided with sensors for capturing bottoming out or which determine the proportion of suspension travel.

In all of the cases it is preferred to allow fine tuning at any time by manual user action. Communication between components may be wireless. It is for example possible for an operating device to be disposed at the bicycle handlebar, communicating wireless with the rear wheel damper and/or the front wheel fork.

It is also possible to transmit the data to the internet where they are stored in a protected or optionally in a public area.

It is also possible and preferred to separately set different channels for the compression stage and the rebound stage.

With the above and other objects in view there is also provided, in accordance with the invention, a method of controlling a suspension system for an, at least partially muscle-powered, two-wheeled vehicle, such as a bicycle, wherein the suspension system includes at least one controllable damper device, a control device and a memory device, and an operating device for controlling the damper device. The method comprises the following steps:

influencing at least one damping characteristic of the damper device by issuing a signal with the control device;

operating the control device in a teaching mode and thereby storing, with the control device, route-related data in the memory device; and operating the control device in a repeat mode wherein the control device controls the damper device according to the route-related data stored in the memory device.

In other words, the method according to the invention serves to control at least one suspension system of an at least partially muscle-powered two-wheeled vehicle having at least one controllable damper device. A control device and a storage device and an operating device are provided for controlling the damper device. At least one damping characteristic of the at least one damper device can be influenced by at least one signal of the control device. The storage device stores in at least one teaching mode route-related data in the storage device. The storage device controls the damper device in at least one repeat mode according to the route-related data stored in the memory device.

In accordance with a concomitant feature of the invention, it is possible to emit maintenance warnings with reference to the stored, route-related data.

Other features which are considered as characteristic for the invention are set forth in the appended claims.

Although the invention is illustrated and described herein as embodied in suspension system for a bicycle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

A first embodiment of the invention will be described with reference to FIGS. 1 to 10, showing a suspension system 100 with a damper device 1 for a bicycle.

Figure 1:
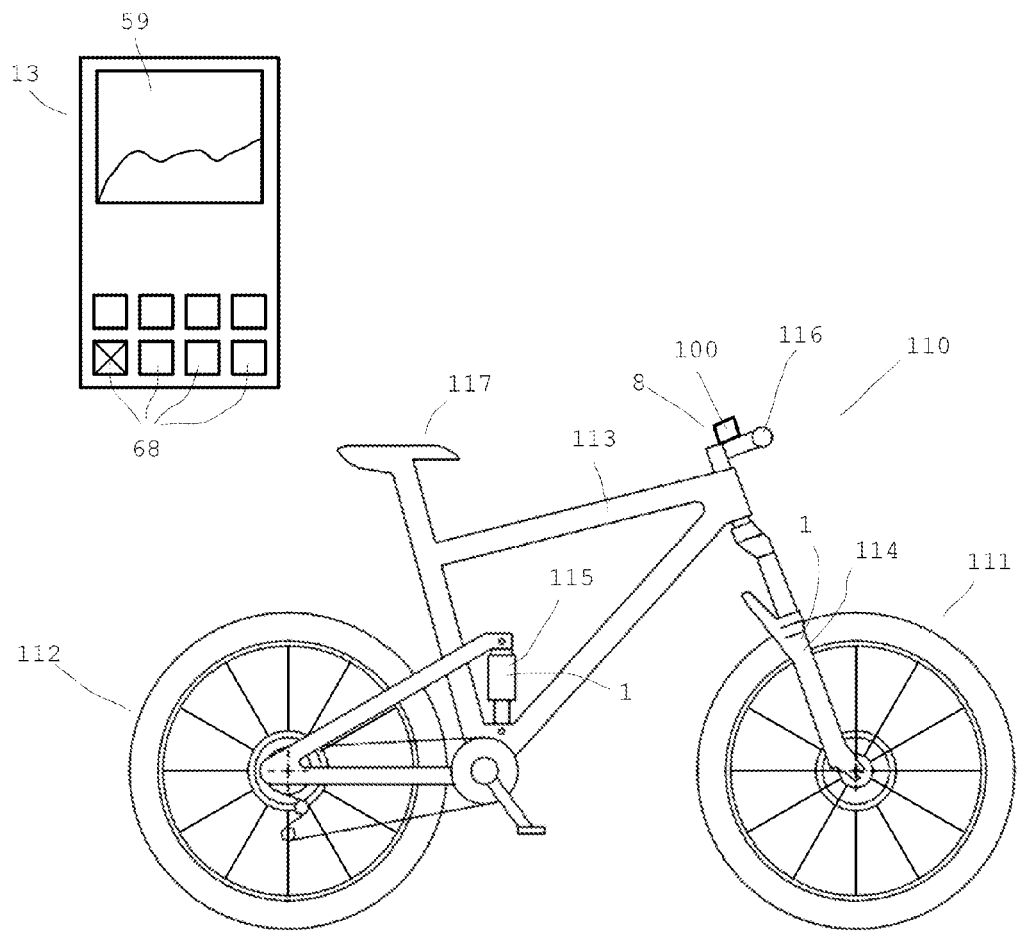
FIG. 1 a schematic illustration of a bicycle with a suspension system according to the invention.

Referring now to the figures of the drawing in detail and first, particularly, to FIG. 1 thereof, there is shown a schematic illustration of a two-wheeled vehicle, here in the form of a bicycle 110 that is configured as a mountain bike, that is equipped with a suspension system 100. The bicycle 110 comprises a frame 113, a front wheel 111 and a rear wheel 112. Both the front wheel 111 and the rear wheel are equipped with spokes and may be provided with disk brakes. A gear shifting system serves to select the transmission ratio. Furthermore the bicycle 110 comprises a saddle 117 and a handlebar 116.

The front wheel 111 is provided with a damper device 1 configured as a suspension fork 114 and the rear wheel is provided with a damper device 1 configured as a rear wheel damper 115. The suspension system 100 is presently provided at the handlebar 116. The suspension system 100 may be incorporated in one of the damper devices 1 or provided in another location.

By means of the suspension system 100 the damping characteristics of the suspension fork 114 and the rear wheel damper 115 are set in dependence on the currently set riding profile and on the other data supplied to the suspension system or which the suspension system 100 can access. The suspension system 100 controls both the suspension fork 114 and the rear wheel damper 115 and optionally also the suspension and/or damping characteristics of the seat post.

For operation an operating device 13 is provided which may be disposed at the handlebar 116 but may e.g. be configured detachable. Depending on the configuration the control device 8 may be incorporated in the operating device 13 or disposed separately therefrom. The operating device 13 may be provided with a display 59 to provide data about the current operating condition, measured data or other data.

The operating device may for example also serve as a bicycle computer and output data about the current velocity, average velocity, kilometers per day, per tour, per lap and total, and about the current position, current altitude and the distance traveled or the distance still lying ahead. The output of further analyses is conceivable as well.

The operating device 13 which in the illustration according to FIG. 1 is greatly enlarged for better clarity and illustrated remote from the handlebar comprises operating knobs 68 or the like.

Figure 2:
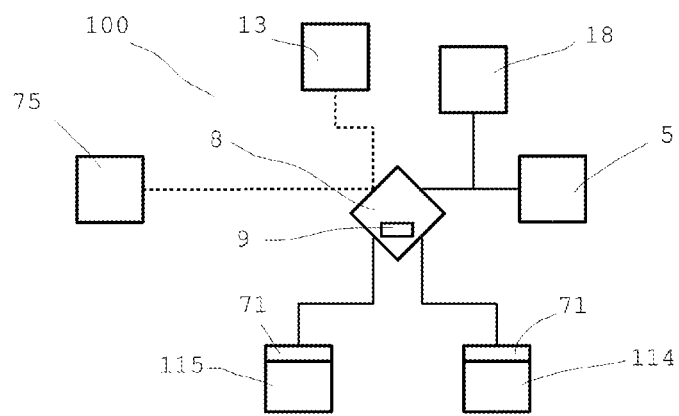
FIG. 2 a schematic illustration of a suspension system.

FIG. 2 shows a schematic illustration of the suspension system 100 wherein the communication connections of the involved components with the control device 8 are inserted. The operating device 13 is connected with the control device 8 via a wire or wireless connection presently shown in dotted lines. The connection is not required to be continuous if the control device 8 does not form part of the operating device 13.

Two sensors 5 and 18 are exemplarily inserted whose measured data are transmitted to the control device 8 as data 6. The sensors may supply data about the current road condition, the current inclination or the current loads on the damper devices 1 which are used for automatically controlling the suspension system 100.

When a lap is traveled again, values stored in repeat mode are retrieved from a memory device or storage device 9 and the damper devices 1 are set accordingly.

The suspension fork 114 and the rear wheel damper 115 are presently equipped with a local control device 71 each which perform local control of the respective damper device 1. It is likewise possible for the control device 8 to centrally control the damper devices 1. A connection with the internet 75 may be established temporarily, as needed or periodically to store, retrieve, or provide to other persons data 6 in a protected or else in a freely accessible area.

Figure 3:
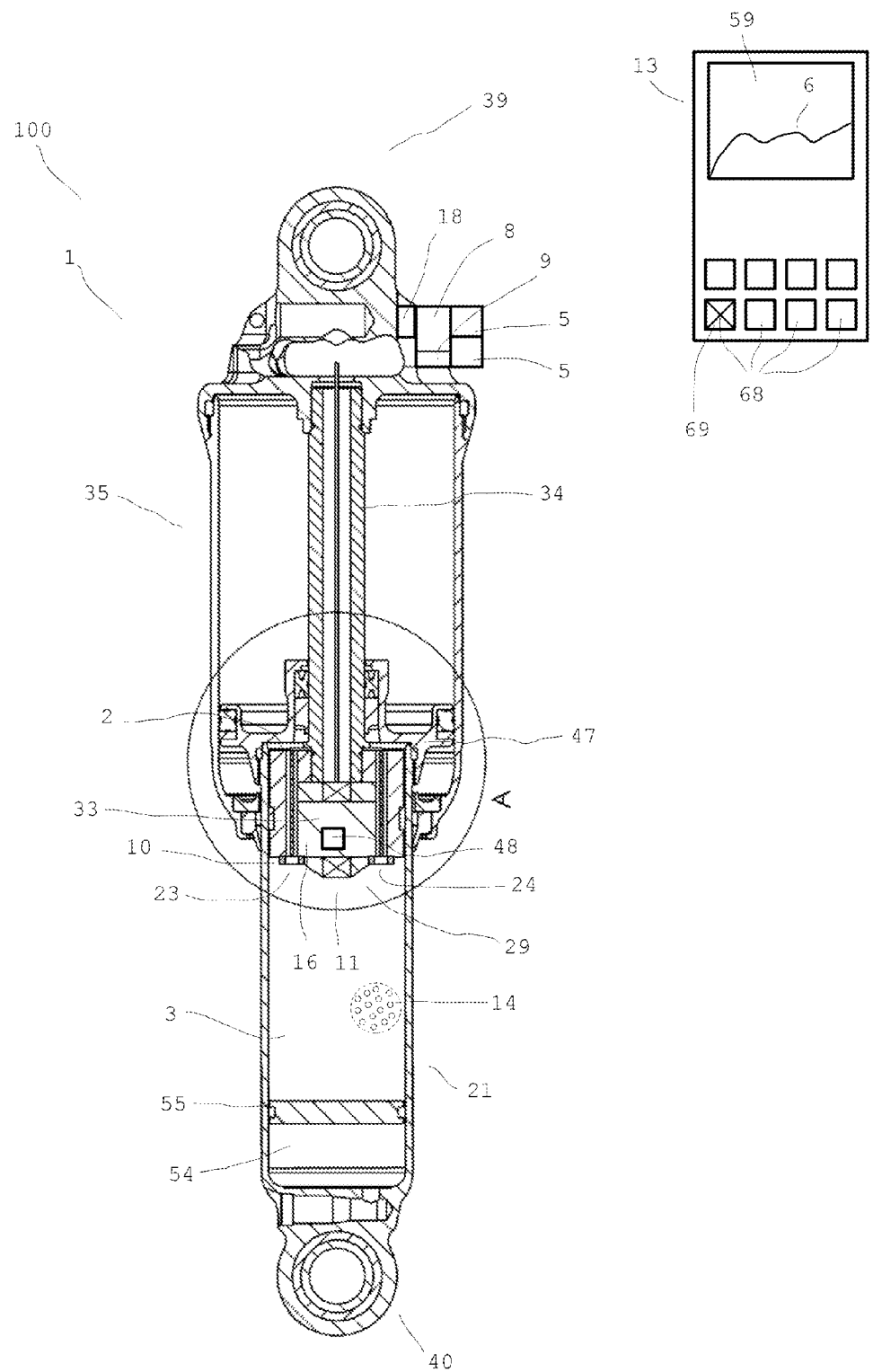
FIG. 3 a suspension system according to the invention with a schematic illustration of a sectional side view of a damper device in the normal position.

The damper device 1 illustrated in FIG. 3 is configured as a rear wheel damper 115 and comprises a first end 39 and a second end 40 which are indirectly or immediately connected with the frame 113 or the rear wheel 112.

The suspension fork 114 illustrated in FIG. 1 is equipped with a damper device 1. It is also possible to equip a suspension system 100 with one controllable suspension fork 114 only or with one controllable rear wheel damper only.

A suspension system 100 which controls both the suspension fork 114 and the rear wheel damper 115 allows a particularly extensive and optimal control of the riding properties of a bi- or multi-cycle thus equipped. Other than use for purely muscle-powered bicycles, use for bi- or multi-cycles and in particular for electro-assisted bicycles is possible and preferred.

The damper device 1 shown in section in FIG. 3 comprises a damper which presently comprises a first damper chamber 2 and a second damper chamber 3 which are separated from one another by a damper piston 29. Damping channels 23 and 24 are provided in the damper piston 29 as flow connections which presently serve for damping in the compression stage and in the rebound stage.

Both the first damper chamber 2 and the second damper chamber 3 and the damping channels 23 and 24 are presently filled with a rheological medium 14 presently configured as a magneto-rheological fluid containing ferromagnetic particles such as carbonyl ferrous powder in a carrier liquid. The carrier liquid is preferably oil-based with additives such as stabilizers, antifreeze agents, abrasion and viscosity improvers. The rheological medium 14 is illustrated simplistically in FIG. 1 in a detail.

The damper piston 29 presently serves as a valve or damping valve 4 with which to control the flow of the magneto-rheological fluid 14 from the first damper chamber 2 to the second damper chamber 3 via the damping channels 23 and 24. By way of a magnetic field of the field generating device 11 the viscosity of the magneto-rheological fluid in the damping channels 23 and 24 is influenced and with increasing field strength, movement of the piston 29 is damped more. Additionally to influencing via a magnetic field an influencing means 10 is also provided. It is configured as a control disk or the like and can if desired close the damping channels 23 and 24 completely e.g. for realizing a lock-out. To avoid overload with the lock-out activated, shims or the like may be additionally provided to reopen the damping channels in the case of particularly great shocks. The influencing means 10 may be provided rotary and transferable automatically or manually from the closed position to the opened position and vice versa.

A piston rod 34 is located after the damper piston 29, extending through a spring device 35 presently configured as a pneumatic spring. The spring device 35 comprises a first spring chamber 41 and a second spring chamber 42, separated by a piston 47.

The suspension system 100 comprises at any rate an electric or electronic control device 8 which may in particular also be provided with a microprocessor or a microcomputer. The control device 8 may comprise a storage device 9 in which data, control programs, program routines, control data, measured data, data about the bicycle and the damper devices 1 employed, and personal user data.

The control device 8 may be provided with a communication device such as a modem or a wire-bound or wireless interface or an independent internet connection via special or standardized interfaces and radio connections.

As shown in FIG. 2, control may be done locally or centrally.

At least one sensor 5 for capturing data is assigned to the control device 8. These data 6 may for example comprise position data 61 of a GPS sensor 18 stored in the storage device 9 with the associated time stamp. Data from a sensor 48 for capturing the field strength of the magnetic field of the field generating device 11 may also be captured, processed, and stored.

The data 6 captured furthermore include measured data about the current state 7 or the operating state. For example data about the current compression or rebound state can be captured. The data about the state 7 may in particular include or represent data about the position of the bicycle or else include data about the road conditions.

Capturing and storing operating data 60, terrain data 62, data about the strength of shocks, about the compression or rebound state of the damper device 1 are also preferred as the data 6. Preferably data about the bicycle speed, optionally the weight of the bicycle and the rider are also stored in the storage device 9.

An operating device 13 is provided for operation. A data connection of the operating device 13 with the damper device 1 exists at least temporarily.

The operating device 13 may comprise buttons or control knobs 68 for operating and at least one display 59 for outputting visual information. Operation is also possible by the touch panel since the display 59 is configured as a touch-sensitive surface which may, other than presses, movements and the like, in particular identify points. Optical or capacitive recognition of user actions is also possible. The display 59 may output the time curve of captured data 6 or of signals 50 to allow the user a direct analysis.

The operating device 13 may be provided with interfaces for transferring data and programs. The interfaces may operate via wire or wireless such that wire-bound and/or wireless data connections are possible. Other than specific connection types, connections via serial, parallel, or network interfaces are likewise possible. Both the operating device 13 and the control device 8 may optionally establish connections and exchange data via infrared, Bluetooth, Wireless Lan, GPRS, UMTS, ANT+ Ethernet, glass fiber and the like. The operating device 13 used may possibly be a handheld or other computer or a mobile telephone or the like. Such an apparatus may run a program for general control.

It is likewise possible for the control device 8 to be disposed in or assigned to the operating device 13. While the operating device 13 does not require continuous contact with the damper device 1 or the control device 8, the control device should at any rate when in operation be in continuous contact with the damper device 1.

The first end 39 may be provided with a manual adjusting organ e.g. for making general changes to the spring characteristics or for specifying normal settings. The adjusting organ may e.g. comprise rotary parts as the adjusting elements. Preferably the current settings as well as the normal settings are controlled via the control device 8.

The storage device 9 is preferably provided with a non-volatile memory for permanent storage of control and user data even without current supply.

The end of the central piston rod 34 is provided with the damper piston 29 which comprises a field generating device 11. The field generating device 11 may comprise at least one electric coil 15 and at least one permanent magnet 16. The permanent magnet 16 may comprise at least one core 33 (see FIG. 5).

For sealing the damper piston 18 in the damper housing 17 a piston ring may be provided as a sealing. Or else it is conceivable for the magnetic field of the field generating device 11 to cause complete sealing from the damper housing 17 since the magnetic field of the field generating device 11 or another magnetic field causes chain-forming of the particles in the magneto-rheological fluid such that sufficient sealing may be effected.

The core 33 of the permanent magnet 16 is enveloped in a coil 15 as the field generating device 11. The core 33 consists at least in part of a hard magnetic material having a coercitive field strength higher than 1000 A/m and in particular higher than 10000 A/m. Presently the core 33 consists entirely of alnico which has a high coercitive field strength and is very temperature resistant. It is an advantage for only one or some parts of the core to be hard magnetic to cut down on the magnetization steps required.

Figure 4:
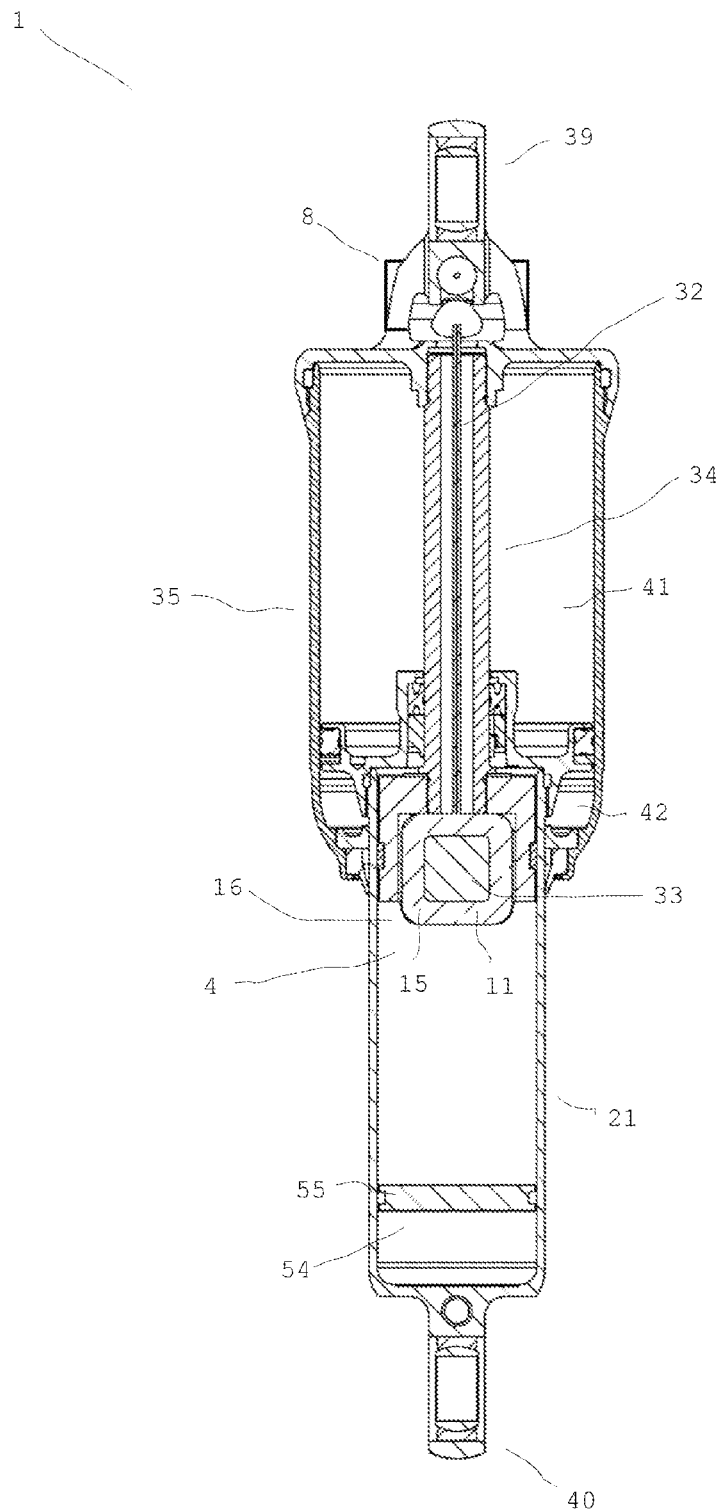
FIG. 4 another sectional side view of the damper device according to FIG. 3.

FIG. 4 illustrates a longitudinal section of the damper device 1 wherein the present longitudinal section is perpendicular to the illustration according to FIG. 1.

One can clearly see in the illustration according to FIG. 2 by the damper piston 29 configured as a valve or damping valve 4 how the electric coil 15 envelops the hard magnetic core 33 of the permanent magnet 16. In this way it is ensured that as the electric coil 15 generates a magnetic pulse 17, a maximum effect on the hard magnetic core 33 is generated so as to achieve reliable setting and changing of the field strength 19 of the permanent magnet 16.

The electric lines 32 for control and energy transmission are clearly recognizable in the illustration according to FIG. 2. By means of the lines 32 the energy required for the electric coil 15 is supplied and control is effected. Optionally it is also possible for the control device 8 to be provided within the damper device 1 such that the lines 21 serve for energy supply only.

The differential spring 54 is typically filled with a gas and is separated from the damper chamber 3 through a floating piston 55. The differential spring 54 serves to equalize the volume when the piston rod 34 dips into the damper housing 21 since then the entire volume available to the magneto-rheological fluid 14 is reduced due to the inserted portion of the piston rod 34.

Figure 5:
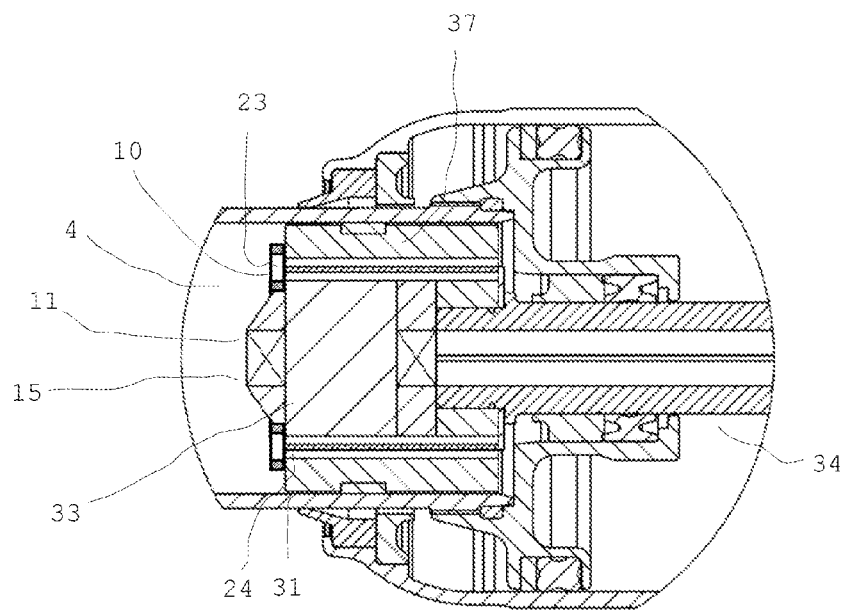
FIG. 5 the detail A from FIG. 3 in an enlarged illustration.

FIG. 5 shows an enlarged illustration of the detail A from FIG. 3.

One can clearly recognize the damping channels 23 and 24 by means of which the flow connection is made available between the first damper chamber 2 and the second damper chamber 3.

The valve 4 presently configured as a damper piston 29 comprises centrally in the middle the core 33 of a hard magnetic material which is enveloped on all sides in an electric coil 15.

The front faces of the core 33 are provided with the damping channels 23 and 24. Finally the core 33 is radially enveloped in a ring conductor 37 which consists of a magnetically conductive material. Preferably the ring conductor 37 consists of a soft magnetic material. Optionally it may at least in part consist of a hard magnetic material.

By way of the ring conductor 37 the magnetic field of the permanent magnet 16 with the hard magnetic core 33 is closed. The field lines of the magnetic field run transverse to the damping channels 23 and 24 to thus allow to achieve a maximum effect on the magneto-rheological fluid 14.

The drawing shows an embodiment variant in which the damping channels 23 and 24 and the ring conductor 37 extend over the entire piston length while the core 33 is only approximately half the length. The power range of the damper may be adjusted through the length of the damping channels 23 and 24 and through the magnetic field strength. A lock-out may be adjusted via the influencing means 10 wherein the influencing means 10 configured as a control disk or the like with the apertures 81 is rotated away from the damping channels 23 and 24. The advantage of an additional influencing means 10 connected in series is that the maximum field strength 51 of the field generating device 11 may be considerably smaller.

In the illustrated embodiment the field of the core 33 is concentrated in a portion of the damping channels 23 and 24. Other core shapes allow to set other power ranges and characteristic damper curves.

Furthermore a valve or damping valve 4 is illustrated which as the damper telescopes out, closes off part of the damping channels 23 and 24 as needed, thus allowing a differentiation of the rebound and compression stages of the damper. A partition wall 25 allows to subdivide the damping channels 23 or 24 into sub-channels 26 and 27 so as to further enhance efficiency (see also FIG. 5 and the pertaining description). The valve used may for example be a prior art shim having a low spring force.

Separate shims or else one-way valves may provide separate damping in the rebound and in the compression stages. For example one channel 23 may be provided for damping in the rebound stage only and one channel 24, for damping in the compression stage only (or vice versa). One-way valves at the damping channels 23 and 24 then preferably prevent any flow through the corresponding channel in the other of the damping stages. It is also possible to provide two different damping valves 4 one of which damping valves 4 comprises at least one channel for damping in the rebound stage and one damping valve 4, at least one damping channel for damping in the compression stage. This allows simple, separate control of the damping characteristics in the rebound and compression stages.

Figure 7:
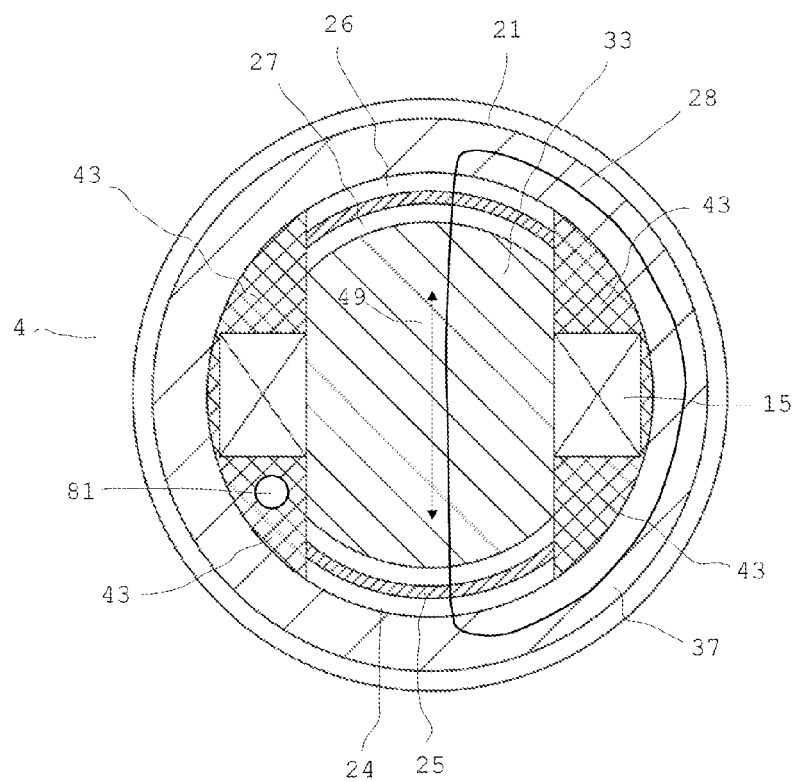
FIG. 7 a cross-section of the damper device according to FIG. 3.

It is furthermore possible to provide at least one separate flow channel 81. Such an additional flow channel 81 may preferably be connected in parallel to the damping channels 23 and 24 and is shown in FIG. 7. Therein the additional flow channel 81 is provided in a region of the isolator 43 such that the cross-section of the flow channel 81 is not at all or only very slightly influenced by a field of the field generating device 11. When the flow channel 81 is provided for a blow-off function, one end of the flow channel 81 is provided with a check valve, a shim or the like which opens automatically as needed. Absent a valve function the flow channel 81 serves as a bypass to achieve a good response reaction.

Figure 6:
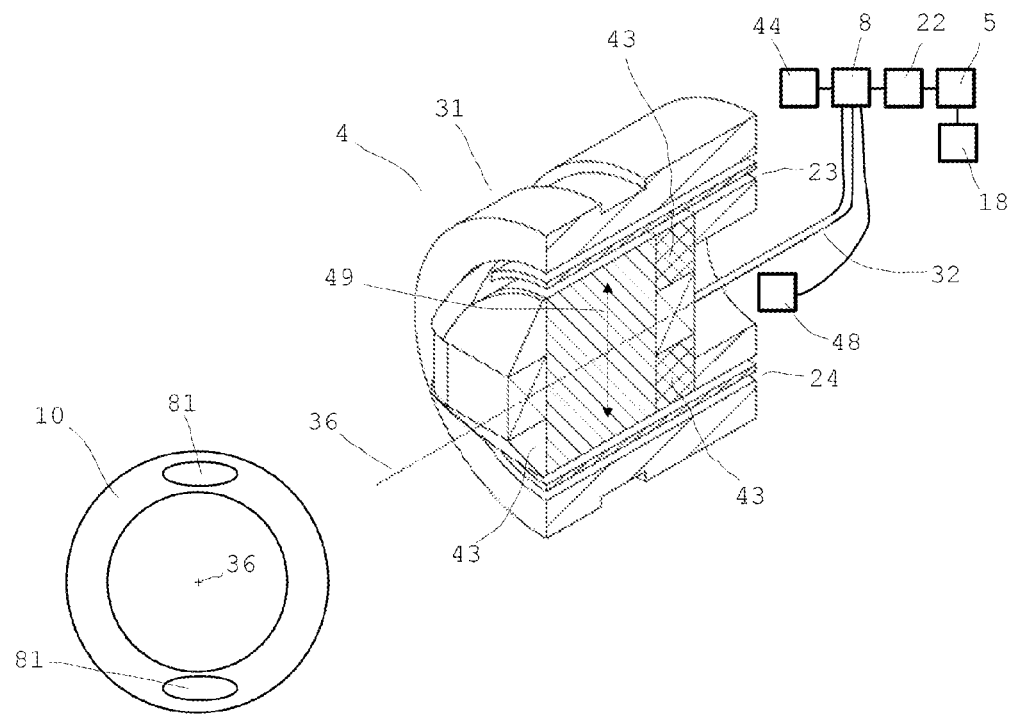
FIG. 6 the valve of the damper device according to FIG. 3 in an enlarged, perspective illustration.

FIG. 6 illustrates a slightly perspective and sectional illustration of the damping valve 4 wherein the connecting axis 49 of north pole and south pole of the core 33 is indicated in the core 33. For sealing and for directing the magnetic field of the core 33, magnetic isolators 43 are provided in the lateral areas such that the magnetic field generated by the core 33 is not deflected laterally but passes through the damping channels 23 and 24 substantially perpendicularly. Presently the damping channels 23 and 24 run approximately parallel to the longitudinal axis 36 of the damper piston 29. In other configurations the damping channels 23 and 24 may be provided on the exterior 31 of the damper piston 29.

FIG. 4 shows a sensor device drawn schematically which may comprise one or more sensors 5, 18 and 48 etc. Preferably a sensor 48 is provided for detecting the magnetic field strength to determine a measure of the strength of the magnetic field generated by the core 33 in the damping channels 23 and 24. Further sensors are possible such as temperature sensors, viscosity sensors, pressure sensors, travel and acceleration and inclination sensors and the like. The sensor device is connected with the control device 8 for controlling the magnetic pulses emitted through the lines 32.

The electric energy required for a magnetic pulse 17 is provided by an energy storage device 22. An energy storage device 22 such as a capacitor or a battery allows to provide the energy required for a magnetic pulse 17 to achieve magnetization or demagnetization of the core 33 even with a power supply having only low voltage and low power. Power supply is also conceivable by means of an e-bike accumulator, a generator, recuperator, a dynamo or in particular also a hub dynamo.

An oscillator circuit device 44 may be provided to ensure defined demagnetization of the core 33. An attenuating alternating magnetic field is applied to the core 33 to thus achieve demagnetization.

FIG. 5 shows a cross-section of the damper device 1 with the damping valve 4, where for better clarity a field line 28 of the magnetic field generated by the core 33 is inserted.

It can be clearly seen that in the region of the damping channels 23 and 24 the field lines 28 pass through the gap nearly perpendicularly (normal relative to the pole faces). This causes chain formation of the magneto-rheological particles along the field lines 28 so as to achieve maximum damping in the flow direction of the damping channels 23 and 24.

The central core 33 presently consists of alnico as a hard magnetic material and comprises a polarization of north pole in the direction of the south pole along the connecting axis 49. In the direction of the ends of the connecting axis 49 the damping channels 23 and 24 are aligned which are presently configured gap-like and which are once again subdivided by partition walls or fan-like elements 25 in the direction of the gap width so as to obtain sub-channels 26 and 27 at the damping channels 23 and 24.

The partition wall 25 preferably consists of a good magnetic conductor such that the partition wall only represents low magnetic resistance. Optionally the partition walls 25 may consist of hard magnetic material and be magnetized permanently—though changeably—by the magnetic pulses 17 of the coil 15.

On both sides of the core 33 one can see in the illustration according to FIG. 7 the coil 15 which wholly envelops the core 33. The sides are additionally provided with magnetic isolators 43 which in these regions much reduce the strength of the magnetic field present there since the magnetic field lines follow the smallest resistance, extending through the core 33 and the ring conductor 37.

In preferred configurations the cross-sectional areas of the damping channels 23 and 24 may be additionally adjustable for example by way of mechanical adjustment.

The damping valve 4 is presently formed by the ring conductor 37, the core 33 received therein, the coil 15 and the magnetic isolators 43, and the damping channels 23 and 24 and the additional flow channel 81.

In the presently illustrated embodiment the damping valve 4 is disposed longitudinally displaceably in the damper housing 21 as the damper piston 29.

It is advantageous to manufacture of alnico only that portion of the permanent magnet 16 that is required to allow maintaining a specific field strength and flow density. For example only a portion of the core 33 may be of alnico and the remainder may consist of another ferromagnetic material.

Or else it is conceivable to manufacture the entire permanent magnet 16 of a material having hard magnetic properties. For example if in FIG. 7 the core 33 and the ring conductor 37 are manufactured for the most part of a hard magnetic material, then its coercitive field strength may be smaller than with only part of the core 33 consisting of a hard magnetic material.

Figure 8:
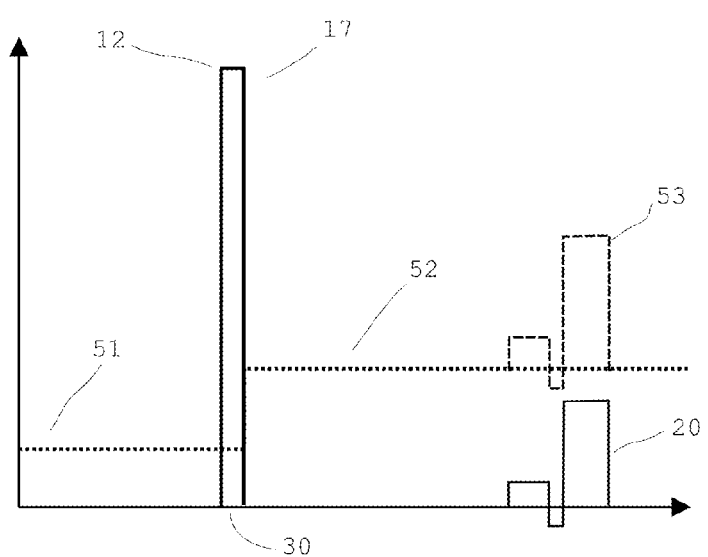
FIG. 8 a schematic time diagram of the magnetic field strength.

FIG. 8 shows the operating principle in changing or setting a desired magnetic fieldstrength 19 from a first magnetic field strength 51 to another magnetic field strength 52. What is shown is the strength of the magnetic field 19 over time wherein the field strength of the core 51 is shown in a dotted line while the magnetic field 12 generated by the electric coil 15 is drawn in a solid line.

It is clearly recognizable that the magnetic field strength 12 generated by the electric coil 15 is zero over most of the time since a magnetic field generated by the electric coil 15 is not required for normal operation and thus no electric energy is required there.

A magnetic field 12 generated by the electric coil 15 is required only if a change of the magnetic field strength of the magnetic device 16 is sought.

Thus the magnetic field strength 51 generated by the permanent magnet 16 firstly has a lower value until a magnetic pulse 17 is triggered by the electric coil 15, wherein the magnetic field strength 12 generated by the electric coil 15 has a corresponding strength to permanently magnetize the hard magnetic core 33 at a corresponding strength.

For example the magnetic field strength of the permanent magnet 16 may be increased from an initially lower field strength 51 to a correspondingly higher field strength 52 to cause a more intense damping or to close the damping valve 4.

While the pulse length 30 for the magnetic pulse 17 is very short and may lie in the range of a few milliseconds, the permanent magnet 16 subsequently has the permanent, high field strength 52 which, given a corresponding magnetic field strength 12 of the magnetic pulse 17, may extend until saturation of the hard magnetic material used. The magnetic field strength 12 generated by the coil 15 during the magnetic pulse 17 causes a permanent change of the magnetic field strength of the magnet 16 from an initial magnetic field strength 51 to a magnetic field strength 52.

In FIG. 8 one can see that the amount of energy saved over a conventional system continuously requiring current depends on the frequency of remagnetizations. However, even in the case of frequent remagnetization, for example once every second, the current requirement is lower than in a similar prior art damper. When remagnetization is activated only as needed, for example as road conditions change, the advantage over other systems becomes much clearer still.

When the core 33 is magnetized to a correspondingly lower level, a correspondingly weak magnetic field 19 is generated. Demagnetization can be generated—as described above—by way of an attenuating alternating magnetic field.

Furthermore FIG. 8 schematically shows on the right in the diagram a situation in which the coil 15 is also used for time-based modification of the active magnetic field 53. When the coil 15 is only subjected to a magnetic field 20 that is weak and e.g. variable over time, as shown on the right in FIG. 8 in a solid line, then the magnetic field 53 active on the whole is influenced correspondingly and is intensified or attenuated, depending on the polarization. This also enables a dynamic influence on the active magnetic field 53 without changing the permanent magnetization of the permanent magnet 16 (field strength 52).

It is also conceivable to employ two or more electric coils in conjunction with corresponding cores.

Figure 9:
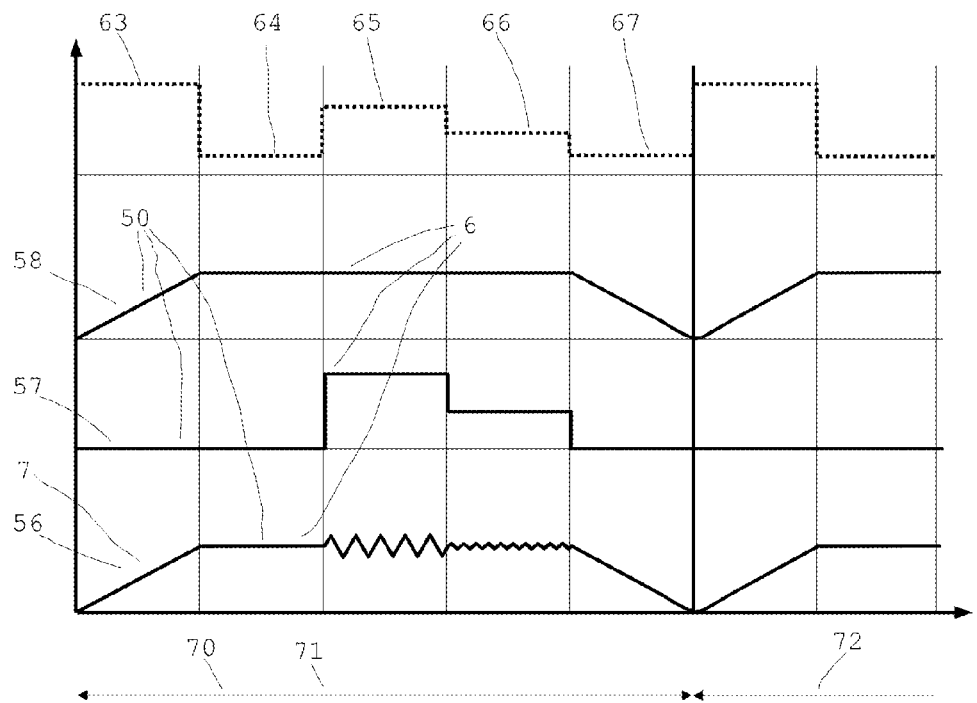
FIG. 9 a schematic illustration of the data in operation in a lap ride.

FIG. 9 shows a schematic diagram of different data 6 and signals 50 over a traveled distance 70. The present traveled distance 70 consists of a first lap 71 and part of an illustrated lap 72. In a first run the control device 8 can in a "teaching mode" capture and store data 6 and emitted signals 50. This also includes the signals 50 by which the damping device 1 or the damping valve 4 are controlled. The operating data 60 are stored as well.

The stored data 6 can be retrieved when running a second lap 72 and the damping device 1 may be controlled in analogy to the first lap without requiring user input at the operating device 13.

In teaching mode all of the data such as measured data and operator input are stored. In repeat mode the data and pertaining signals 50 are retrieved depending on the current position and the signals 50 are employed for controlling the control device 13 without requiring new user input. An "override" function may be provided which even in repeat mode allows, and prioritizes, all of the operator input, storing these for the next lap. The laps 71 and 72 do not have to be traveled immediately successively. It is likewise possible for lap 71 to be traveled on one day and the lap 72 at a later time on the same day or on another day.

It is also possible and preferred for the stored data of a lap 71 to be transmitted to another suspension system 100 where they serve as the basis for control. For example the manufacturer, clubs or private individuals may store data including pertaining signals 50 and provide them for third persons.

In FIG. 9 different curves are specifically shown over the traveled distance 70. The bottom curve 56 for example shows a simplistic altitude profile of the traveled distance 70. The distance starts with a climb, followed by a flat, plane stretch. This is followed by a stretch involving heavy jolts and finally a stretch involving slight jolts before a slope follows and the starting point is reached again and lap 72 begins.

The curve 57 schematically shows the intensity of jolts over the run of the road. One can clearly recognize the heavy-jolt stretch on the road section involving a high mean jolt intensity. The smaller-jolt stretch shows a section of medium jolt intensity. In what is presently just a simplistic view no relevant jolts are inserted or recognizable in the area of the climb, the plane stretch, and the slope.

The curve 58 illustrates the altitude data of the GPS sensor 18 which determines the current altitude either directly or derives the altitude data from map data stored in the memory via the determined local position. By way of the curve 58 the control device 8 can detect climbs or slopes. In conjunction with maps with an altitude profile stored or accessible via a data line advance conclusions are possible about the length of a climb or a slope if the intended route is known.

After a ride or after a predetermined or selectable time interval or else directly upon command an analysis of the states of the spring and suspension system can be carried out. When it is found for example that the full suspension travel was not used at all or only rarely then the control device can automatically emit the recommendation to decrease the spring hardness of the system. Reversely an increase of the spring hardness or else of the suspension may be recommended.

During rides, many different parameters may be captured and stored. Storage is in particular possible of data or curves about the stroke of the damper device, the traveling speed, accelerations in the traveling directions and perpendicular or transverse thereto, and about the inclination of the ground, the quantity and respective positions of changes to the damping characteristics, and about the pedaling frequency, the current transmission ratios of the shifting system, the heart rate of the user, etc.

For example if the suspension system by way of the pedaling frequency, the quantity and strengths of damping, the current speed, and by way of climbs and optionally of the heart rate of the user, draws the conclusion that the user is tired, a higher damping may be set to allow the user a more comfortable ride. This may be the case for example if the traveling speed is low while a relatively high heart rate is present although the terrain is plane and the road surface is smooth. Conversely, in the case of high traveling speeds in a plane terrain the conclusion of a good road surface is possible even without analyzing the damping processes such that damping can be adjusted accordingly.

The speed profile allows conclusions about the current riding situation. When a stretch is traveled once or on a regular basis at a high speed, the user will be in training or in a race, such that the suspension system adjusts conditions accordingly. Now if the user travels the same stretch slowly another time, the user is for example riding home relaxed after finishing the training lap, where other damping characteristics may make more sense or be simply more comfortable.

The curve with the signals 63 to 67 shows the signals 50 which the control device 8 emits. The individual signals 63 to 67 can then be automatically determined by the control device 8 or entered by the user. Automatic determining may be based on previously stored data 6.

Presently the signal 63 is emitted which for example causes a lockout of the damper device 1 to avoid what is unnecessary damping in the gradient of the first stretch. At the same time the signal 63 may cause compression of a suspension fork as the damping device 1 to allow the user a more comfortable sitting position in a steep uphill ride.

The signal 63 may be emitted on the basis of a corresponding user input or based on automatically captured values. For example when the suspension system 100 by means of the GPS sensor 18 identifies the gradient and the degree and length of the incline via stored map data or a previously traveled lap 71, then the signal 63 may be emitted automatically for lockout or blocking the damper device 1 optionally with concurrent lowering of the front wheel fork.

Prior to automatic changes to the damper settings the control device 8 may optionally emit an optical and/or acoustic and/or other type of signal so as to not surprise the user with changes such as lowering a suspension fork.

It is also preferred for in particular major changes to the damping characteristics to be carried out only upon confirmation e.g. by pressing a knob or upon acoustic confirmation by the rider. Major changes include in particular lowering a suspension fork since this results in a different riding position.

In the plane stretch section the signal 64 is emitted which presently only causes minor damping. What is also possible in particular in plane stretches without particular jolt loads, continues to be intense damping or locking the damper device 1.

In the following stronger-jolt stretch a signal 65 is emitted which presently causes more intense damping. Subsequently the signal 66 is emitted having low damping in the minor-jolt stretch. In the sloping stretch the signal 67 is emitted for a still weaker damping by the user or automatically.

In all of the cases an automatic generating of signals 63 to 67 on the basis of the other sensor-captured data 6 is preferred. The intensity and type of damping may in particular also depend on the selected operation or operating mode. Manual operation may be possible at any time.

In all of the configurations it is preferred in the case of a low energy level to set predefined properties in good time. When the available remaining energy in the storage device falls below a predetermined level, such as 5% or 10%, a warning signal may be emitted and/or automatic switching to predefined or set emergency running properties or normal properties occurs. This allows to ensure that a return ride or continued ride with reasonable normal settings is always possible. In the case of another, in particular higher threshold of e.g. 10%, 15%, 20% or 25%, switching over to an energy saving mode is possible in which settings requiring less energy are made. In damper devices having remanence properties the number of remagnetizations per unit time may be reduced. It is likewise possible to limit the number of intermediate stages.

The energy store 22 may be provided rechargeable and in particular exchangeable. This allows to adapt the size, capacity and thus also the weight of the energy store 22 to the desired conditions. In racing or competition conditions a precisely fitted energy store 22 is employed. For day trips it may be chosen larger than for short trips. E-bikes basically have energy already available such that a separate energy store 22 can be dispensed with.

It is possible and preferred for a (basic) calibration to be done by the manufacturer. Fine calibration may be done by the team or the club or the local bicycle dealer. In the scope of maintenance, reset and re-calibration can be done.

Figure 10:
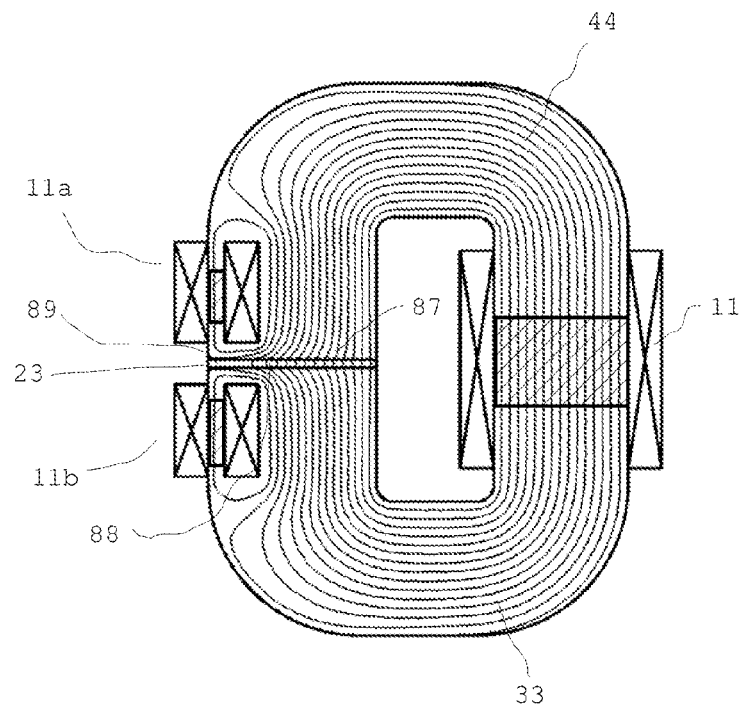
FIG. 10 a schematic illustration of a damping valve.

FIG. 10 illustrates a damper device 1 in which three different field generating devices 11, 11a and 11b are provided. Each of the field generating devices 11, 11a and 11b may comprise one permanent magnet and one electric coil. The remaining structure of the damper device 1 may be identical to the structure in FIG. 3.

The three different and intentionally variable field generating devices 11, 11a and 11b allow a still wider variety of adapting the damping properties. Different adjustments of each of the respective magnetizations allow a wide variety of settings for the damping channels 23 and 24.

The sum of the individual fields of the field generating devices 11, 11a and 11b amounts to a total field which flows through the damping channel 23 respectively 24. The shape of the field influences the characteristic damper curve 65. The field generating device 11 presently determines the normal strength of the field 51. The field generating devices 11a and 11b can influence the field in the damping channel 23 or 24 respectively.

When the polarization of the field generating devices 11a and 11b is the same as that of the field generating device 11, then the magnetic field in the damping channel 23 is homogeneous, its strength depending on the magnetization of all of the field generating devices. When the polarization of the field generating devices 11a and 11b is inverse that of the field generating device 11, then an inhomogeneous magnetic field is formed in the damping channel 23.

Different sections are formed such as an effective section 87 with the maximum field strength, a transition section 88 with a sharply dropping field strength, and a bypass section 89 with virtually no or only very minimal field strength. The shape of the sections depends on the magnetization of each of the field generating devices and may be adjusted over a wide range. Or else it is possible to polarize the two field generating devices 11a and 11b in opposite senses wherein one of these is polarized the same as the field generating device 11. In this way the adjusting range of the damper device 1 may be enlarged further.

The gap width of the damping channel 23 is considerably less than is the gap length, the ratio of gap length to gap width exceeding the factor 2 and being in particular higher than 5 or even higher than 10.

Figure 11:
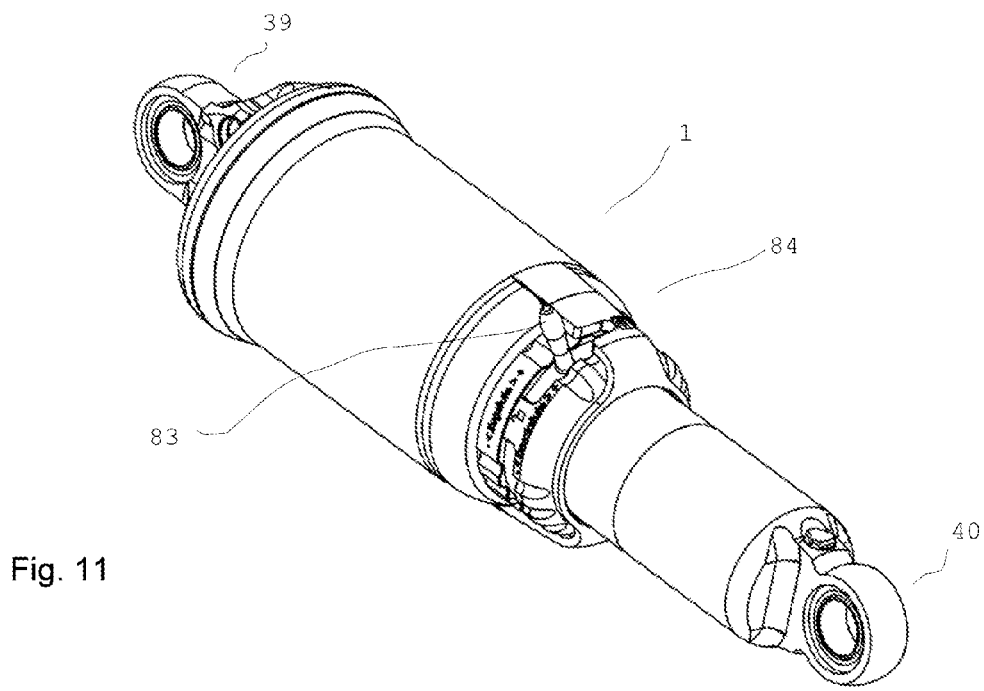
FIG. 11 a perspective view of another damper device.

In FIG. 11 a perspective view of another damper device 1 is illustrated which is basically provided with the same functions as the damper device in FIG. 10. In this way the damper device 1 can be controlled by a control device 8 in dependence on data 6 from sensors 5. Additionally a mechanical operating lever 83 is provided which can be shifted from the first position 84 illustrated in FIG. 11 via the position 85 illustrated in FIG. 12 to the third position 86 illustrated in FIG. 13. Intermediate positions are possible.

Shifting the operating lever 83 adjusts the proportion of the damping channels 23 and 24 which are exposed to a magnetic field of a specific strength. The cross-section of the damping channels 23 and 24 can in turn be subdivided into three sections namely, an effective section 87, a transition section 88, and a bypass section 89. Selecting a position 84, 85 or 86 allows to select the ratios of the sizes of the sections 87 to 89 relative to one another. In the position 86 the bypass section is largest, and in position 84, smallest in size.

Figure 14:
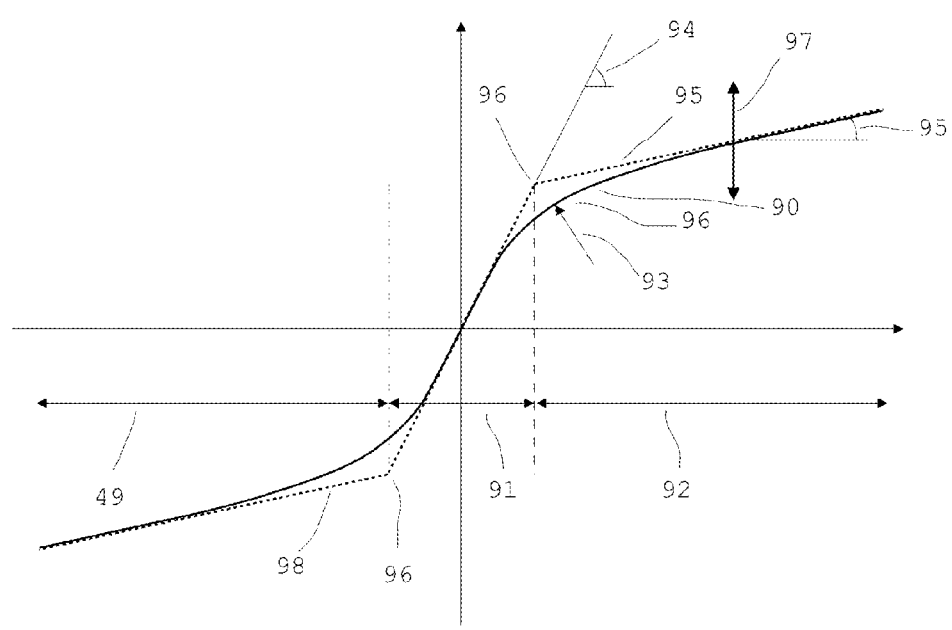
FIG. 14 the characteristic curve of the valve according to FIG. 10.

FIG. 14 shows a characteristic damper curve 90 of the damper device 1 according to FIG. 10 with the damping valve 4 in a force-speed diagram of the damper piston. The low-speed section 91 and the high-speed section 92 are connected with a radius 93 through a gentle rounding. The characteristic curve is presently structured symmetrically, showing the same curve for the rebound and the compression stages. Basically though, different curves of the two stages are possible and desired.

Figures 12, 13:
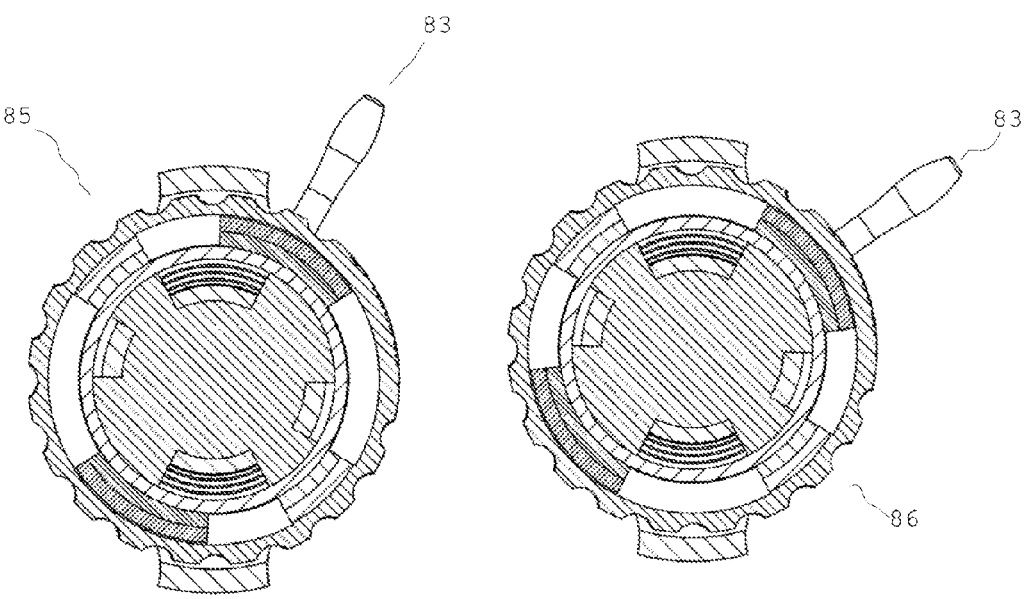
FIG. 12 a section of the damper piston of the damper device according to FIG. 11 in a first position.
FIG. 13 a section of the damper piston of the damper device according to FIG. 11 in a second position.

Basically the characteristic curve of the damper device 1 according to the FIGS. 11 to 13 also corresponds to the characteristic curve 90. Variations are achieved by way of the size of the bypass section 89 and the transition section 88 and of the locking section or effective section 87.

In the damper device 1 according to FIG. 10 the gradient 94 of the characteristic damper curve in the low-speed section 91 is substantially determined by the bypass section 89. In the high-speed section 92 the gradient 95 is substantially determined by the cross-section of the entire damping channel 23 or 24 and the strength of the field in the effective section 87.

In the transition section 88 over the extension of which an attenuating magnetic field is effective, the advantageous, non-linear contour leads to the rounding which leads to a comfortable and safe operation.

What is also drawn in is an arrow 97 showing the effect of a magnetic field having different strengths. Given a stronger magnetic field, the characteristic curve will shift upwardly while with a weaker magnetic field it will shift downwardly.

Dotted lines show a characteristic damper curve 98 which would be present without any transition section 88 if, other than the magneto-rheological damping channel 23 or 24, an additional damping channel 81 is provided as the bypass channel.

The gradient in the low-speed section 94 is adjustable by means of the portion of the bypass section 89. The larger the bypass section 89, the smaller the gradient. The zero passage is also generated by the bypass section 89 since damping fluid can at any time flow through the bypass section 89 without being influenced such that damper piston movement will be triggered already by weak forces.

The gradient in the high-speed section 95 is influenced by the shape of the entire damping channel 23 and 24 and the set strength of the magnetic field 52 in the effective section 87.

The area with the rounding which is significant for comfort and safety is rounded by way of the transition section 88 of the damping channel 23 or 24 so as to enable an ergonomic and safe operation. The size of the rounded area follows from the size and shape of the transition section 88 which can be flexibly adjusted by corresponding adjustment of the strength of the magnetic fields of the field generating devices 11, 11a and 11b. Power supply by means of a generator, dynamo or in particular a hub dynamo is conceivable as well.

The invention provides an advantageous suspension system which may comprise one, two, or more dampers. By way of storing the data and later retrieval, data may be exchanged and made available to friends, club pals, and quite generally other persons. In this way every user can test, compare, and check their own personal riding style. Inexperienced users may resort to proven values on known distances. Experts and professionals may try out experimental settings and feel their way to the optimum. The gained experiences may for example be exchanged in clubs or in particular in internet forums. Exchanging experiences gained with specific settings will result in understanding.

This specification describes and claims an invention that is related, in several respects, to our copending, concurrently filed patent application, which is herewith incorporated by reference in its entirety.

The invention claimed is:

1. A suspension system for an, at least partly muscle-powered, vehicle, the suspension system comprising:
at least one controllable damper device;
a control device, a memory device, and an operating device for controlling said damper device;
said control device being configured to output a control signal for influencing at least one damping characteristic of said damper device;
said control device being configured to operate in a teaching mode in which route-related data are stored in said memory device; and
said control device being configured to operate in a repeat mode in which said damper device is controlled according to the route-related data stored in said memory device.

2. The suspension system according to claim 1, which comprises at least one sensor configured for acquiring, during operation, route-related data about an operational state and operator input for storing in said memory device.

3. The suspension system according to claim 1, wherein said control device is configured to store operator data as the data in the memory device.

4. The suspension system according to claim 1, wherein said damper device is formed with at least two damper chambers coupled with one another.

5. The suspension system according to claim 4, which comprises at least one sensor disposed to capture movements of a damper piston relative to said damper chambers.

6. The suspension system according to claim 1, which comprises a GPS sensor for capturing position data representing a current position of the vehicle.

7. The suspension system according to claim 1, wherein said control device is operable in a repeat mode, wherein said control device controls said damper device in accordance with control data retrieved from said memory device in correspondence with related position data.

8. The suspension system according to claim 1, wherein by way of position data and/or terrain data at least one damping characteristic of the damper device can be set.

9. The suspension system according to claim 1, wherein said control device is configured for operation in an expert mode.

10. The suspension system according to claim 1, wherein a suspension travel limit can be set.

11. The suspension system according to claim 1, wherein stored data can be transmitted.

12. The suspension system according to claim 1, wherein said damper device is one of at least two damper devices disposed to be operated coupled with one another.

13. The suspension system according to claim 1, wherein said at least one damper device comprises at least one controllable damping valve.

14. A method of controlling a suspension system for an, at least partially muscle-powered, two-wheeled vehicle, the suspension system including at least one controllable damper device, a control device and a memory device, and an operating device for controlling the damper device, the method which comprises:
influencing at least one damping characteristic of the damper device by issuing a signal with the control device;
operating the control device in a teaching mode and thereby storing, with the control device, route-related data in the memory device; and
operating the control device in a repeat mode wherein the control device controls the damper device according to the route-related data stored in the memory device.

15. The suspension system according to claim 14, which comprises selectively emitting maintenance warnings based on the stored data.

\* \* \* \* \*